United States Patent
Roberson (10) Patent No.: US 9,795,119 B2
(45) Date of Patent: Oct. 24, 2017

(54) DEVICE FOR CONTROLLING THE MOVEMENT OF AN ANIMAL

(71) Applicant: Lucy Roberson, Cornwall (GB)

(72) Inventor: Lucy Roberson, Cornwall (GB)

(*) Notice: Subject to any disclaimer, the term of this patent is extended or adjusted under 35 U.S.C. 154(b) by 7 days.

(21) Appl. No.: 14/374,845

(22) PCT Filed: Jan. 25, 2013

(86) PCT No.: PCT/GB2013/000030
§ 371 (c)(1),
(2) Date: Jul. 25, 2014

(87) PCT Pub. No.: WO2013/110918
PCT Pub. Date: Aug. 1, 2013

(65) Prior Publication Data
US 2014/0331943 A1    Nov. 13, 2014

(30) Foreign Application Priority Data

Jan. 27, 2012   (GB) .................................. 1201433.8

(51) Int. Cl.
*A01K 15/04*    (2006.01)
*A01K 3/00*     (2006.01)
(Continued)

(52) U.S. Cl.
CPC .............. *A01K 15/04* (2013.01); *A01K 3/005* (2013.01); *A01K 13/006* (2013.01);
(Continued)

(58) Field of Classification Search
CPC ...... A01K 15/00; A01K 15/02; A01K 15/021; A01K 15/028; A01K 15/029; A01K 15/04; A01K 3/005; A01K 13/006; A01K 13/008
See application file for complete search history.

(56) References Cited

U.S. PATENT DOCUMENTS

| 326,228 | A | * | 9/1885 | Look ....................... F16B 45/00 24/265 H |
| 2,442,992 | A | * | 6/1948 | Beard ................... A01K 15/006 119/765 |

(Continued)

FOREIGN PATENT DOCUMENTS

| CH | 290525 A | 5/1953 |
| DE | 29603847 U | 6/1996 |

(Continued)

OTHER PUBLICATIONS

Search Report under Section 17 based on application No. GB1201433.8, May 17, 2012, 1 page.
(Continued)

*Primary Examiner* — Michael Wang
(74) *Attorney, Agent, or Firm* — Jason Saunders; Arnold & Saunders, LLP; Christopher McKeon (57) ABSTRACT

A device for controlling an animal is provided, the device comprising a support to be worn by the animal; a first contact member mounted on the support and disposed in a position for contacting an electric fence when the device is being worn by the animal; a second contact member, mounted on the support and in electrical contact with the first contact member, the second contact member being disposed on the support to be in contact with the animal when the device is being worn by the animal; whereby, in use, an electrical current is conducted from the first contact member to the second contact member and an electric shock provided to the animal at the site of the second contact member when contact is made between the first contact member and an electric fence by the animal. The device is particularly suitable for controlling the movements of a horse or a pony. The device is preferably formed as a rug, blanket or a vest to be worn by the animal.

14 Claims, 6 Drawing Sheets (51) Int. Cl.
*A01K 13/00* (2006.01)
*A01K 15/00* (2006.01)
*A01K 15/02* (2006.01)

(52) U.S. Cl.
CPC .......... *A01K 13/008* (2013.01); *A01K 15/006* (2013.01); *A01K 15/029* (2013.01)

(56) References Cited

U.S. PATENT DOCUMENTS

| | | | | |
|---|---|---|---|---|
| 5,158,039 | A * | 10/1992 | Clark | A01K 15/02 119/712 |
| 6,470,832 | B1 * | 10/2002 | Peacock | A01K 13/007 119/850 |
| 2008/0110414 | A1 * | 5/2008 | Buehner | A01K 13/006 119/712 |
| 2012/0052231 | A1 * | 3/2012 | Sundnes | A41D 31/0061 428/52 |

FOREIGN PATENT DOCUMENTS

| | | | | |
|---|---|---|---|---|
| FR | | 2294634 A | 12/1975 | |
| SE | FR 2294634 A1 * | | 7/1976 | A01L 3/005 |

OTHER PUBLICATIONS

International Search Report based on International application No. PCT/GB2013/000030, Form PCT/ISA/210, Jun. 5, 2013, 4 pages.
SSM, Feb. 24, 2011, "Electric Fencing and Rugged Horse", Horse and Hound Forums [online]. Available from www.horseandhound.co.uk/forums/archive/index.php/t-438323.html [accessed May 17, 2012].

* cited by examiner

DEVICE FOR CONTROLLING THE MOVEMENT OF AN ANIMAL

The present invention relates to a device for controlling the movement of an animal, more particularly to a device that may be worn by the animal to be controlled. The invention finds particular use in the control of animals, including, but not limited to farm animals, such as horses, ponies and the like.

The use of electric fences to control and limit the movement of animals, for example livestock, is well known. An electric fence, as commonly known in the art, comprises a number of bare wire conductors, supported on insulators and connected to a fence energiser, which is in turn connected to a power source and earth rods. Early electric fence configurations utilised alternating current (a.c.) and were typically used to kill or severely wound upon contact. More recent designs of electric fence utilise so called non-lethal energisers producing direct current (d.c.). Modern electric fences, as it will be appreciated, find particular use in the control and management of livestock. Details of the design and use of electric fences in the control of livestock may be found in a report by I. G. McKillop et al., 'Electric Fence Reference Manual', DEFRA Research and Development Surveillance Report 607.

As noted above, one of the key elements of an electric fence system is an energiser. Energisers may be mains or battery operated, depending on the application required. In use, an energiser acts to generate pulses of d.c. voltage, which are delivered along the length of the fence. The size of energiser, quantified by the amount of electrical energy output, measured in joules (J), is again determined by the desired application. Typical output values are in the order of between 300 millijoules (mJ) and 5 joules. In addition to an electrical output rating, energisers are also specified according to the maximum length of fence that can be powered effectively. Again, the maximum length, of fence depends on the application, installation and the type of wire conductors used.

Insulators are also an important aspect of any electric fence system. Typically made from porcelain or thermoplastic, insulators form a point of isolation between the conductive wires and the fence support material. In addition to porcelain and thermoplastic insulators, insulators are also available in a number of further forms, depending on the design of the system.

Another important aspect of an electric fence system is the conducting wire or conductors. The conducting wire of an electric fence can be of steel, aluminium or aluminium alloy, depending on the design of the system.

Conducting wires may be single or multi-stranded. Simple single conducting wires include medium-tensile steel wires, high-tensile steel wires, spring-steel wire and aluminium wire. Multi-strand cable wire, which is typically made from 6-12 strands of medium-tensile zinc coated steel wire may be used an alternative. Other forms of conducting wire include polywire, electric meshing and polythene tape. Perhaps one of the most common types of conducting wire, particularly in inexpensive installations, is that of polythene tape. Polythene tape consists of stainless steel wires and polythene strands woven to form a ribbon.

In addition to multi-strand conducting wire, certain applications may require more than one length of conducting wire, arranged at certain heights from the ground. This configuration lends itself to applications where animals having a range of heights are being controlled. As described above, configurations comprising one or more lengths of conducting wire require the correct energiser, an energiser with sufficient power output to power the system.

The basic operating principle of an electric fence is as follows. Once installed and energised, the fence is considered to be live. On contact with the fence, the animal in contact with the ground creates a circuit and as such provides a path for current to flow. The animal receives an intermittent shock, depending on that set by the energiser. The pulsed nature of this shock deters the animal from progressing closer and as such causes the animal to act instinctively and move away. Additionally, the pulsed nature of the shock acts as a deterrent, without the risk of electrocution.

Electric fencing and their systems are particularly useful in controlling animals, in both a temporary and permanent setting. In situations where animals having a similar height are being controlled, an inexpensive configuration of fence is to have a single conducting wire or polythene tape comprising the whole length of the fence. This configuration is common and well-known in the art.

However a number of problems can arise with this configuration. Perhaps the most significant, is the escaping or breaking through of animals, particularly by the breaking or tearing of conductive wires. Also, smaller animals, such as ponies, may be able to pass beneath the conductors of an electric fence.

A conducting collar for sheep is disclosed in FR2294634, the collar enhancing the effect of the electrical shock caused by an electric fence. The collar comprises an antenna which may include one or more electrical sensors capped by protective tips. A weight, diametrically opposed to the antenna, maintains the antenna in an upright position.

Accordingly, there is the need for an improved system for controlling animals, including, but not limited to farm animals, horses and the like. In particular, there is the need for an improved system for improving the efficiency of electric fence systems, to greatly reduce animals from breaking through electric fences.

According to the present invention, there is provided a device for controlling an animal, the device comprising:
a support to be worn by the animal;
a first contact member mounted on the support and disposed in a position for contacting an electric fence when the device is being worn by the animal;
a second contact member mounted on the support and in electrical contact with the first contact member, the second contact member being disposed on the support to be in contact with the animal when the device is being worn by the animal;
whereby, in use, an electrical current is conducted from the first contact member to the second contact member and an electric shock provided to the animal at the site of the second contact member when contact is made between the first contact member and an electric fence by the animal.

The present invention provides a device for controlling the movement of animals, in particular a device which addresses the problems associated with the breaking through or past of electric fencing by animals, such as livestock, farm animals, especially horses and the like. In particular, the device of the present invention provides a means for providing an electric shock to the animal, when the animal would otherwise be insulated from the effects of an electric shock provided by an electric fence system. Such a situation arises, for example, when the animal, such as a horse or a pony, is wearing a cover, such as a rug or blanket, as is common practice in the art. The cover or blanket on the animal acts as an insulator, preventing the animal from receiving an electric shock when coming in contact with an electric fence or significantly reducing the intensity and effects of the electric shock. The device of the present invention may be employed with such a cover. Alternatively, as described in more detail below, the device of the present invention may be incorporated into a cover, such as a rug or blanket, for use on the animal.

The device of the present invention may be used with any animal that is restrained by means of an electric fence. As noted, the device finds particular use for livestock. It has been found that the device is particularly effective in controlling and training horses, ponies and the like. Aspects and details of the device of the present invention will be described in more detail below, in particular with reference to a horse. However, it is to be understood that this reference is purely exemplary and the device may be constructed and used in analogous manner with other animals.

As indicated above, the device of the present invention comprises a support to be worn by the animal. In use, the support provides means onto which the first contact member is mounted and secured into position. The support further provides means onto which the second contact member is mounted, to contact the animal. In this respect, the support of the device allows for the device to be attached to the animal and further, preferably, provides securing means to secure the device in position on or around the animal, when in use.

The support may be of any suitable shape and size for mounting on and/or securing to the animal, such that the first contact member and second contact member are disposed in their correct, respective positions relative to the animal. In one embodiment, the support comprises one or more straps arranged to extend around part of the body of the animal. For example, the support may comprise a single strap for extending around the girth of the animal. In another embodiment the support comprises a plurality of straps. In this case, the support is arranged to extend around one or more different parts of the body of the animal, for example with straps extending around the neck and/or front of the animal. Suitable straps and material for forming straps are known in the art.

In a preferred embodiment the support comprises a support pad for extending across at least a portion of the back of the animal. It is also particularly advantageous if the support comprises a further support pad for extending across at least a portion of the neck of the animal. Suitable means for securing the support pad to the animal, such as straps, buckles, ties and the like are known in the art.

As noted above, the first contact member and the second contact member are mounted to the support. The support is arranged to hold the first contact member at an appropriate position on or with respect to the animal, such that the contact member will touch the conductors of an electric fence as the animal moves towards and into contact with the electric fence. Details of the position of the first contact member are described hereinbelow.

In a particularly preferred embodiment, the support comprises one or more sheet portions which, in use, cover portions of the body of the animal. In particular, the support comprises one or more sheet portions that are complimentary in shape to portions of the animal, for example the back and/or front of the animal. In this respect, it is particularly preferred that the support is complimentary in shape to the animal, such that it may placed over the animal, in particular across the back of the animal, and secured in place. It has also been found to be particularly advantageous for a sheet portion of the support to extend across a portion of the neck of the animal.

In one preferred embodiment, the support comprises a cover, such as a rug or blanket that may be placed on the back of the animal. Covers, such as rugs and blankets for animals, such as horses and ponies, are well known in the art and their construction, shape and configuration will be known to the person skilled in the art.

The support may be formed from any suitable material. In particular, the support is preferably formed from materials that are strong, lightweight, flexible, easily formable to the shape of the animal, waterproof and durable. Furthermore, a material having breathable characteristics is also preferred, in particular when the support is in the form of a sheet or a cover. The material may be in the form of a mesh or a woven material, for example a woven material having a loose or open weave. Suitable materials include canvas, particularly cotton canvas, nylon, polyester (mesh) and similar synthetic materials.

In one preferred embodiment the support is formed from a plurality of layers of materials. In this respect, the support comprises a first, protective layer, the first layer overlaying a second, breathable layer. Such a construction is known in the art for forming covers, such as rugs and blankets for horses and the like. The materials of construction of blankets and rugs for animals are known in the art.

As noted previously, the device of the present invention further comprises a first contact member. The first contact member is mounted on the support and disposed in a position on the support for contacting the conducting elements of an electric fence when the device is being worn by the animal. The first contact member provides a location on the animal from which an electrical, current is conducted from an electric fence, and subsequently conducted to the second contact member, where an electric shock is provided to the animal.

As noted above, in use, the first contact member is located on the support in a position for contacting an electric fence, when the device is being worn by the animal. It will be appreciated that the precise position of the first contact member required to contact the conducting element of an electric fence will vary from animal to animal, depending upon such factors as the type of animal, the size of the animal, and its pattern of movement or behaviour. For example, it has been found to be particularly advantageous for the first contact member to be located on the front and sides of the body of the animal, in particular when the device is being used on a horse. In addition, the required position of the first contact member will also depend upon the height of the electric fence, in particular the conducting elements of the electric fence, in relation to the height of the animal.

As noted above, it is known for smaller animals, such as ponies, to attempt to pass underneath an electric fence, in particular an electric fence originally arranged and installed for retaining a larger animal, such as a horse. For ponies and other smaller animals, it has been found to be advantageous for the first contact member, in use, to be located on the top of the neck or back of the animal. In this respect, the first contact member is located in a position on the support to contact an electric fence conductor, in the event that the animal contacts a conductor of the fence by lifting its head from beneath the conductor, as can often be the case.

The device may comprise a single first contact member, disposed at a single location on the support. For example, considering that an animal may walk forwards in an attempt to pass through an electric fence, the single first contact member may be located on the support so as to lie on the front portion of the animal, when the device is in use. A single first contact member may be arranged in a similar manner at other positions on the support, so as to lie at other positions on the animal. In this case, it is preferable that the first contact member has a large surface area to present to the electric fence. For example, the first contact member may comprise a strip, sheet, mesh or other grid-like structure of electrically conductive material.

More preferably, the device comprises a plurality of first contact members disposed on the support. In particular, the device may comprise a plurality of first contact members disposed at or around a position on the support. For example, the device may comprise a plurality of first contact members disposed on the support so as to be presented from the front of the animal, when the device is in use. Similarly, the device may comprise a plurality of first contact members arranged at or around other positions on the support, so as to be presented at other positions from the animal.

Alternatively, the device may comprise a first contact member disposed at each of a plurality of positions on the support, so as to be presented from each of a plurality of different positions on the animal, when the device is in use. For example, the device may comprise a first contact member on the support so as to be presented from each of the front, sides of the animal and, optionally, the upper part of the neck. As noted above, in such an arrangement, it is preferred that the first contact member at each location has a large surface area to present to the electric fence. For example, the first contact member at each position may comprise a strip, sheet, mesh or other grid-like structure of electrically conductive material.

When the first contact member is in the form of a sheet of material, the contact member may extend across two or more positions on the support, so as to be presented from two or more positions on the animal, when in use. For example, the first contact member may comprise a sheet of material that, in use, extends from one side of the animal, across its front to the other side.

As a further alternative, the device comprises a plurality of first contact members disposed at a plurality of positions on the support, so as to be presented from a plurality of positions on the animal, when the device is in use. In one embodiment, the device comprises a single first contact member located at each position on the support. Alternatively, a plurality of first contact members is arranged around one or more positions on the support of the device. In this way, the device is suitable for use on a range of different animals or animals of a range of different sizes, or for use with electric fences of a range of heights.

The plurality of first contact members may be arranged at the or each position in any suitable pattern. In one embodiment, the plurality of first contact members are arranged in one or more lines or strips at the or each location, in particular one or more lines or strips extending substantially vertically when the device is in use.

The or each first contact member may be permanently mounted to the support. Alternatively, the or each first contact member may be releasably mounted to the support, for example to allow the position of the first contact member to be changed and adapted to the particular animal and the height of the electric fence, when in use.

The first contact member may be formed from any suitable material for contacting with a conductor of an electric fence and conducting an electric current. In particular, the first contact member is preferably formed from a material that is flexible and lightweight. It is also preferred if the first contact member is formed from a material that is durable and has a degree of weather resistance. The material used to form the first contact member should also be a conductor. A conductive metal is particularly well suited to the construction of the first contact member. In one embodiment the first contact member comprises a bare or exposed metal portion for contacting the conductor of an electric fence. Alternatively, the metal portion of the first contact member may be coated or covered, for example by a polymer layer. Such an arrangement is known in the art for forming the conductor elements of an electric fence.

Alternative configurations for the first contact member include strips of conductive material, for example arranged into a grid pattern, and conductive mesh.

In one preferred embodiment the first contact member is formed from a conductive fabric. Suitable electrically conductive fabrics may be formed by incorporating conducting elements, such as wires, into the weave of the fabric.

In another preferred embodiment, the contact member comprises a conductive mesh. In one arrangement, the mesh is arranged to extend across the front of the animal and at least a portion of one or both sides of the animal, when the device is in use. The mesh may consist of a single portion or sheet or a plurality of such portions or sheets. Similarly, the mesh may extend along or across the neck and/or back of the animal, when the device is in use, as described above. Again, this arrangement may comprise one or a plurality of discrete portions of mesh.

Suitable conductive meshes and fabrics are known and are commercially available. Examples of such materials include meshes and fabrics used for EMF screening.

The device of the present invention further comprises a second contact member. In use, the second contact member is provided and mounted in a position on the support so as to be in contact with the animal when the device is being worn by the animal. The second contact member provides means for delivering an electric shock to the animal, the electric shock being provided by a current conducted by the first contact member from an electric fence to the second contact member.

The second contact member may be located at any suitable position on the support to deliver the electric shock to the animal. In a similar manner to the first contact member, the location of the second contact member will vary from animal to animal. The location of the second contact member will depend upon such factors as the size of the animal and the orientation of the device on the animal. For example, it has been found to be particularly advantageous for the second contact member to be located on the shoulder and/or the wither and/or the chest of the body of the animal, in particular when used on animals, such as horses. For ponies and smaller animals, it has also been found to be advantageous for the terminal to be located in corresponding similar locations.

The device may comprise a single second contact member disposed at one of the aforementioned locations. Alternatively, the device may comprise a plurality of second contact members, each located at a different location on the support.

The or each second contact member may be permanently mounted to the support. Alternatively, the or each second contact member may be releasably mounted to the support, for example to allow the position of the second contact member to be changed and adapted to the particular animal, when in use.

The second contact member may be formed from any suitable material for conducting an electric current. In particular, the second contact member may be formed from a material that is flexible and lightweight so as to be formable to the body of the animal. In a similar manner to the material from which the first contact member is formed, it is particularly preferred if the second contact member is formed from a material that is durable and has weather resistance. A conductive metal is particularly well suited for use in the construction of the second contact member. In one embodiment the or each second contact member comprises one or more portions, such as strips or similar, of bare metal. Alternatively, the second contact member may comprise one or metal portions covered in a layer of material, such as a polymer. In an alternative embodiment the or each second contact member comprises one or more conductive pads.

The or each second contact member may be electrically connected directly to a first contact member. Alternatively, a first contact member may be connected to a second contact member by an electrical conducting element, such as a cable or wire or the like. This arrangement is preferred when the support of the device comprises a cover, such as a rug or blanket, that is electrically insulating. In this case, an electrical conducting element is used to provide an electrical connection between a first contact member, disposed on the outside of the support and a second contact member disposed on the inside of the support, when in use.

Each first contact member may be connected to a respective second contact member. Alternatively, a second contact member may be connected to a plurality of first contact members. Alternatively or in addition, a plurality of first contact members may be connected to a plurality of second contact member In a particularly preferred embodiment, the or each first contact member is provided with one or more corresponding second contact members. It has been found to be particularly advantageous to have at least one first contact member connected to at least one second contact member, wherein the first contact member and the second contact member are situated on the same portion or region of the animal, such as a side of the animal or its front. In this case, when the device is in use and contact is made with the conductor of an electric fence, and thus a current is conducted, directional control of the animal can be achieved, as the animal will have a tendency to move away from the region of the electric shock.

In a particularly preferred embodiment, a plurality of corresponding first contact members and second contact members are provided on a given region or position of the animal, such as the front or a side. This configuration has been found to provide sufficient stimulus for urging the animal to move away from the location of the shock and thus away from the electric fence.

In one embodiment, the device of the present invention is in the form of a fabric vest, worn around the neck and front of the animal. In this embodiment, the vest forms the support, the device further comprising one or more first contact members disposed on the outer surface of the vest and one or more second contact members disposed on the inner surface, as worn by the animal, and in contact with the skin of the animal.

In an alternative embodiment, the device of the present invention is incorporated in a rug or blanket, with the rug or blanket forming the support. The device further comprises one or more first contact members disposed on the outer surface of the rug or blanket and one or more second contact members disposed on the inner surface, as worn by the animal, and in contact with the skin of the animal.

As described above, when the device is used in combination with a rug, it is important for the operation of the device that the first contact member forms the outermost portion of the device and as such is positioned so as to make contact with an electric fence when the device is in use. In a similar manner, it is important that the second contact member is positioned so as to be in contact with the skin of the horse, when the device is in use. Again in this configuration, means for connecting the first contact member to the second contact member is provided, which may be in the form of direct connection between the first contact member and the second contact member, or by alternative means, such as a wire or the like, as described above.

Embodiments of the present invention will now be described by way of example only, having reference to the accompanying drawings, in which.

The device of the present invention is shown in the accompanying figures and described below in use in conjunction with a horse. However, it is to be understood that this is for illustration purposes only and that the device finds use in conjunction with other animals. References hereinafter to a horse are to be construed accordingly.

Figure 1:
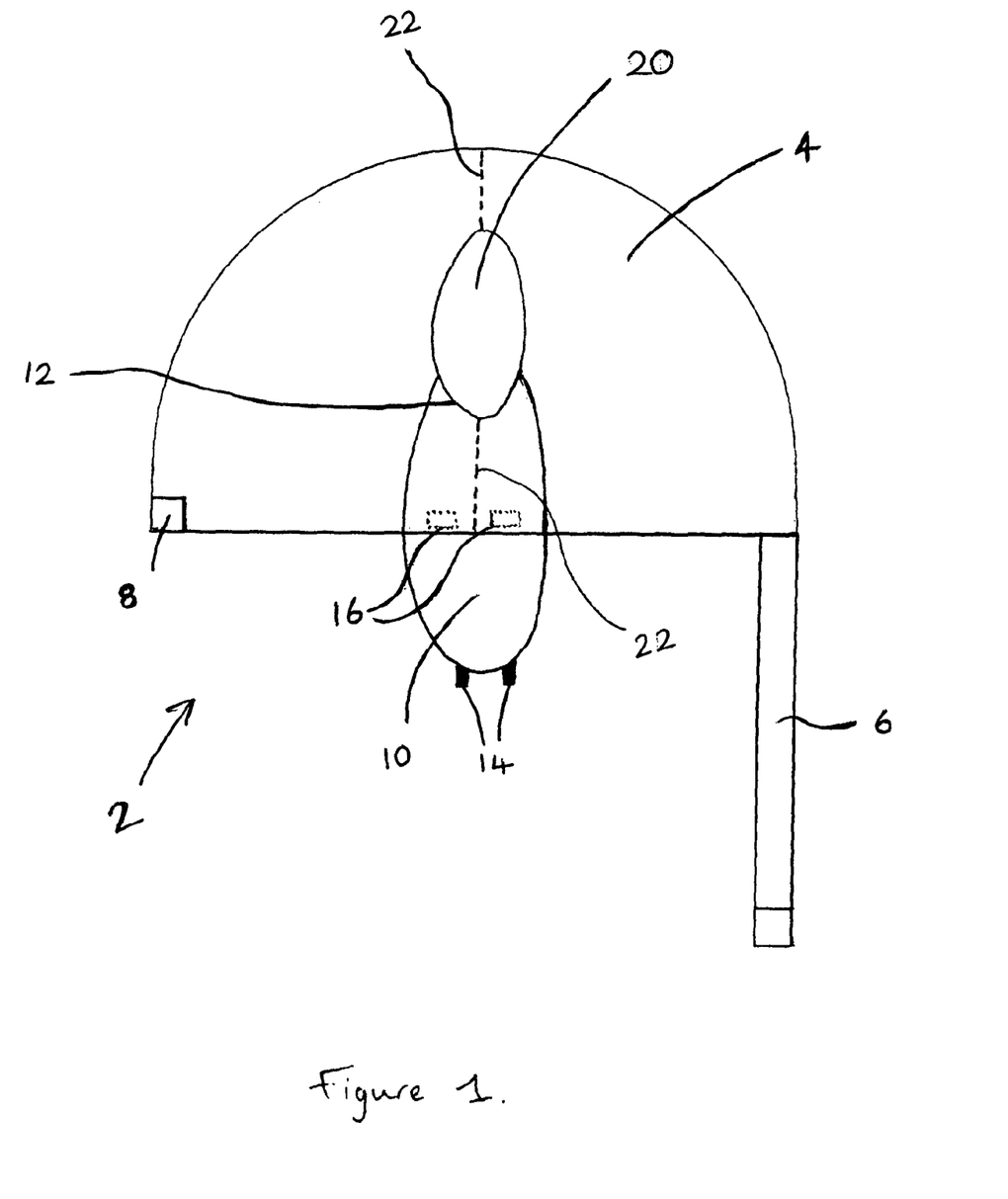
FIG. 1 is a plan view of the external features of the device according to one embodiment of the present invention.

Referring to FIG. 1, there is shown a device according to one embodiment of the present invention, generally indicated as 2. The device 2 is intended to be worn by a horse, when in use, as will be described in more detail below. The device may be applied to other animals in analogous manner.

The device 2 comprises a support in the form of a support sheet 4. The support sheet 4 forms a vest that is worn by the horse. The support sheet 4 may be of any suitable shape that provides support for the other components of the device 2, without causing discomfort to the horse. The support sheet 4 is formed so as to be complimentary in shape to the front, back and sides of the horse. The support sheet 4 is further shaped to conform to other features of the horse, such as the crest, shoulder and chest regions. The support sheet 4 is generally formed from a polymer material, such as Nylon®, however it will be appreciated that other materials can also be used. The support sheet 4 may take the form of a conventional vest or bib, which are well known in the art.

The device 2 further comprises straps 6 having buckles 8 for fastening and securing the support sheet 4 to the horse, when the device is fitted and in use. Alternatives means for fastening the device to the horse include clips, or portions of a hook and loop fastener.

The device 2 further comprises a first contact member 10. As shown in FIG. 1 and more clearly indicated in FIGS. 3 and 4, the first contact member 10 is position on the support sheet 4 to be generally the most forward facing portion of the device 2, when the device is being worn by a horse. In this way, the horse presents the first contact member 10 forwards from its front, such that when the horse moves forwards, contact is made with an electric fence. The first contact member 10 is attached to the support sheet 4 by any suitable means. As shown, the contact member 10 is stitched across the neck line of the support sheet 4, as indicated by reference numeral 12.

The first contact member 10 is in the form of a sheet of fabric, the fabric comprising a conductive mesh. Accordingly, the first contact member 10 forms a flap of material that extends from the neck line 12 and over the front portion of the support sheet 4.

The first contact member 10 further comprises clips 14 for connecting the contact member 14 to the support sheet 4. The clips 14 are received on the support sheet 4 at a position 16, located under the first contact member 10.

Figure 2:
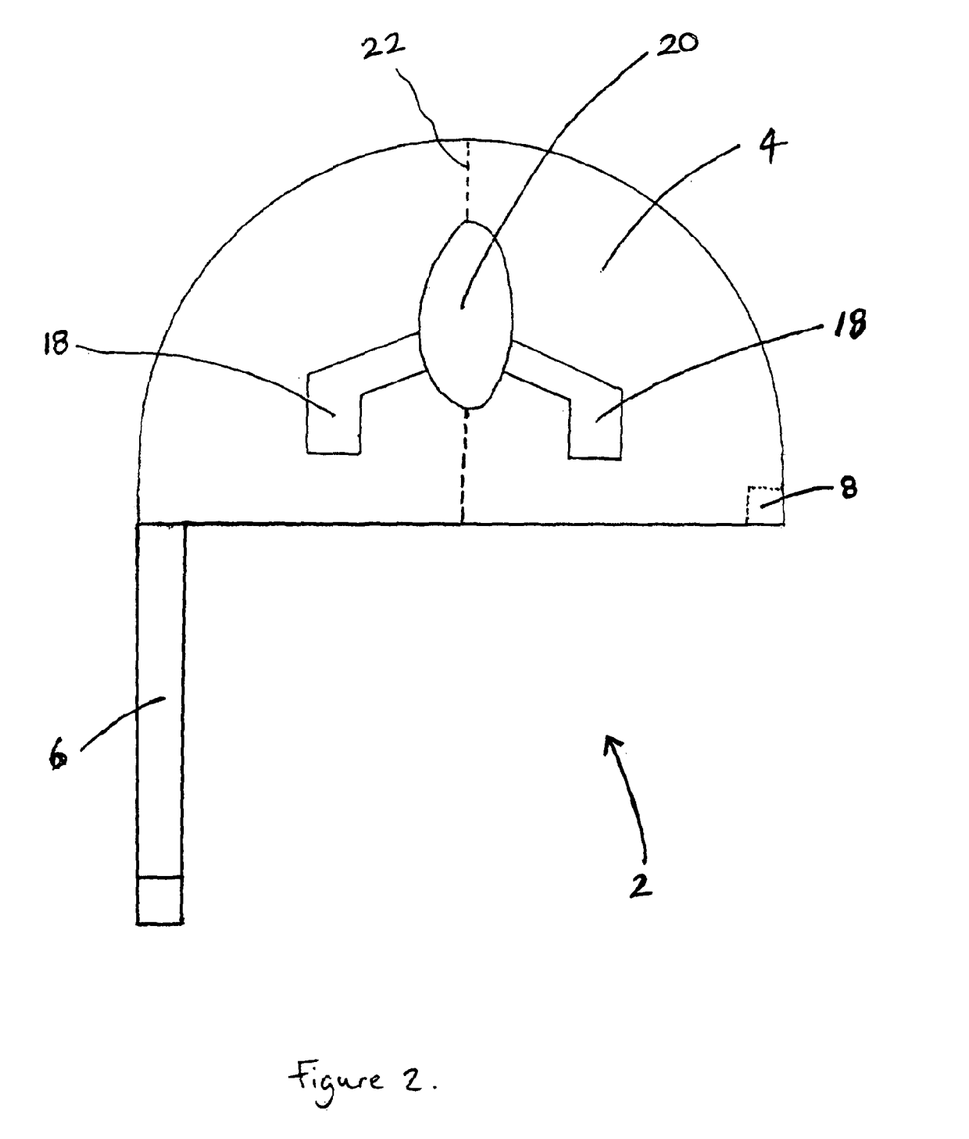
FIG. 2 is a plan view of the internal features of the device of FIG. 1.

The device 2 further comprises a second contact member 18, as shown more clearly in FIG. 2. The second contact member 18 is positioned symmetrically about a centre line 20, as shown in FIGS. 1 and 2, defining a line of symmetry that, in use, sits along and parallel to the spine and wither of the horse. It will be appreciated that the precise location of the second contact member 18 will vary from animal to animal, however is generally positioned to contact the skin of the animal, when the device is being worn by the animal. The second contact member 18 provides a point at which an electric shock may be delivered to the horse, when the device is in use.

The second contact member 18 is provided in the form of a fabric, the fabric comprising a conductive mesh. The second contact member 18 is fastened to the innermost side of the support sheet 4 by being stitched to the support sheet, so as to be permanently attached. The second contact member 18 is located so as to be directly electrically connected to the first contact member 10. As indicated above, FIG. 2 shows the reverse side or internal features of the device 2 of FIG. 1. In this configuration, the second contact member 18 is position parallel to the first contact member 10. In this respect, the second contact member 18 and the first contact member 10 are positioned to be directly connected, so as to conduct an electrical current from the first contact member 10 and deliver it directly at the second contact member 18 to the animal.

The device 2 is fitted to the horse by first lifting the support sheet 4 and placing it over the head of the horse, with the head passing through the opening 20 (shown in FIGS. 1 and 2). The device 2 is symmetrical in shape and has a centre line 22, defining a line of symmetry that, in use, sits along and parallel to the spine and wither of the horse. In this respect, the portions of the support sheet 4 extending on opposite sides of the centre line 22 are disposed equally on opposing sides of the horse. Following fitting of the device 2, to the horse, opposing sides of the support sheet 4 are wrapped around the respective sides of the horse, extending away from centre line 22.

Figure 3:
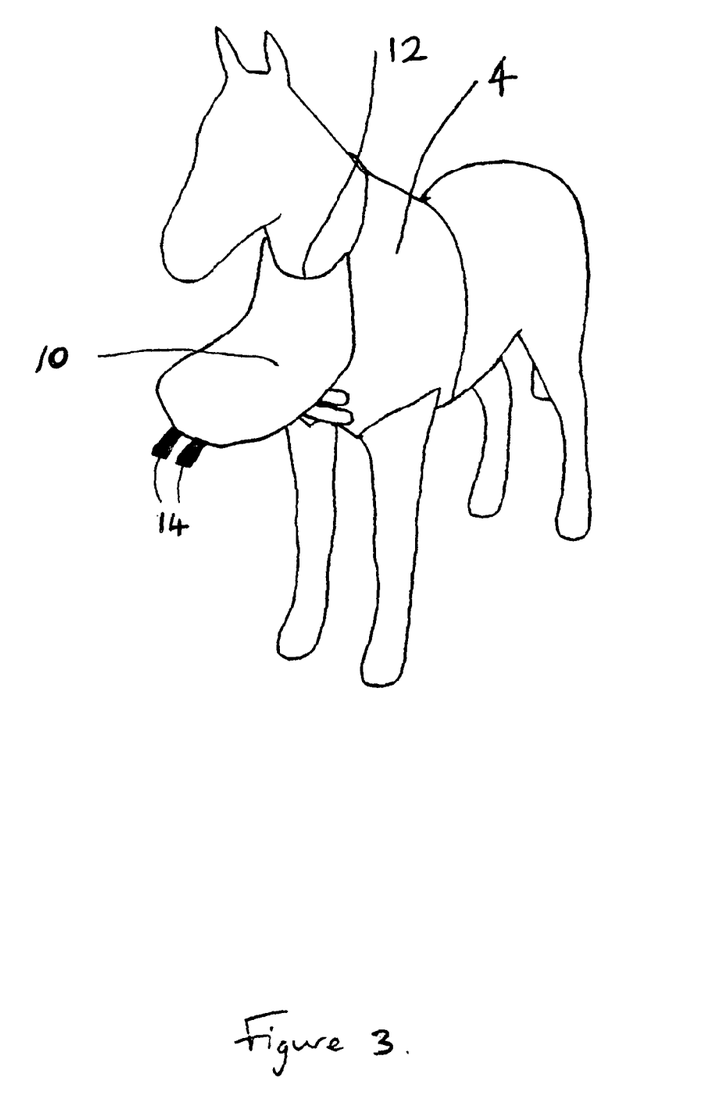
FIG. 3 is a perspective view of a horse wearing the device as shown in FIGS. 1 and 2, with the device partially fitted to the horse.
Figure 4:
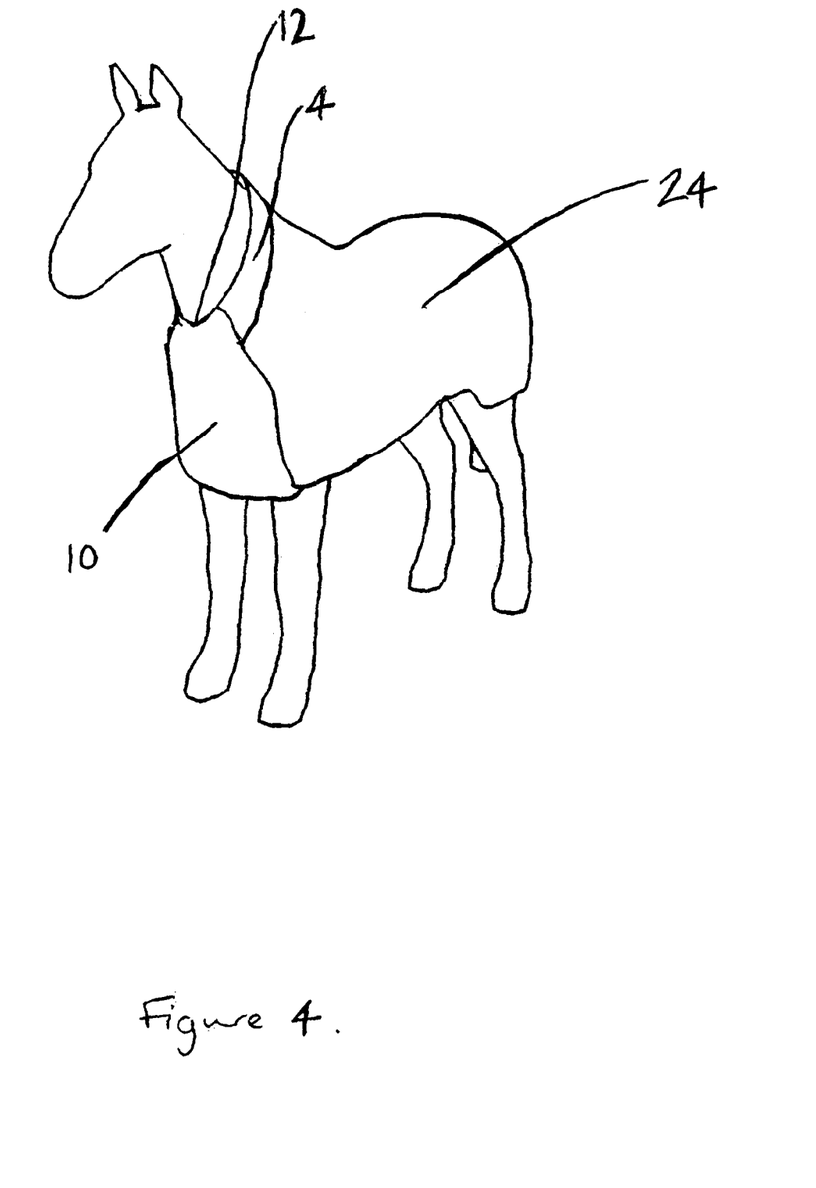
FIG. 4 is a perspective view of the horse of FIG. 3 with the device according to the first embodiment of the present invention, fully fitted in combination with a blanket.

FIG. 3 shows the device 2 according to the first embodiment of the present invention partially fitted to a horse. With reference to FIG. 3, it can be seen that the device 2 has been fitted as described above. Fitting of the device 2 to the horse is completed by folding the first contact member 10 from a first, unfastened position (as shown in FIG. 3) to second, fastened position as indicated in FIG. 4. The first contact member 10 is secured to the underside of the support sheet 4 by way of clips 14. In this embodiment fitting of the device 2 is complete once the contact member 10 has been secured to the support 4 by clips 14.

In an alternative technique, the device 2 may be used in combination with a rug 24, as shown in FIG. 4. In this respect, the device 2 is fitted as detailed hereinbefore and the first contact member 10 is secured to the rug 24 by clips 14. Corresponding clips are provided on the underside of the rug 24.

Figure 5:
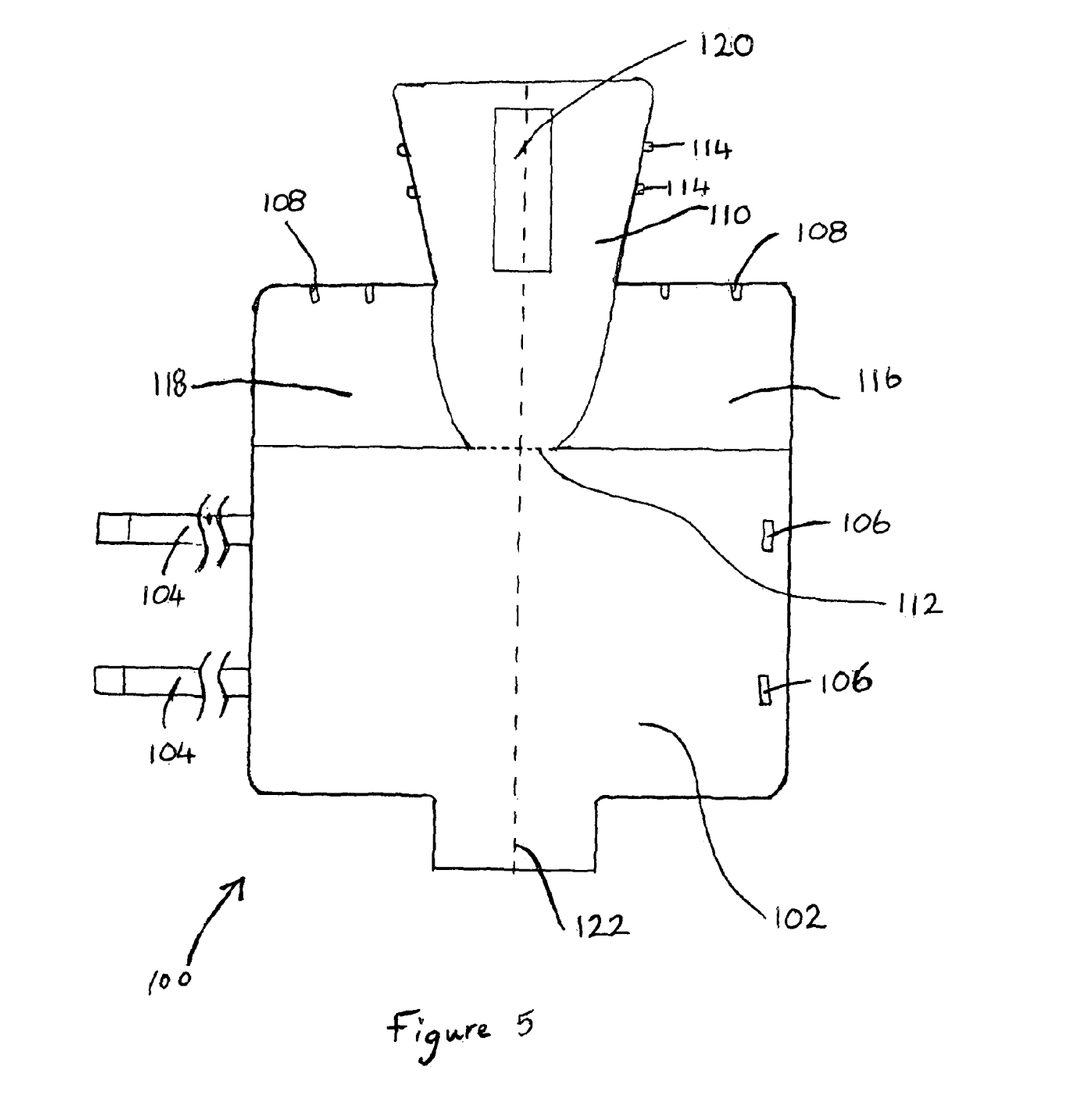
FIG. 5 is a plan view of the external features of the device according to a second embodiment of the present invention.

Referring to FIG. 5, there is shown a plan view of a second embodiment of the device according to the present invention, generally indicated as 100. The device 100 is intended to be worn by a horse, when in use, as will be described in more detail below.

The device 100 comprises a support sheet 102 formed so as to be complimentary in shape to the back and sides of the horse. The support sheet 102 is further shaped to conform to other features of the horse, such as the crest, shoulder and chest regions. The support sheet 102 is generally formed from a polymer material, such as Nylon®, however it will be appreciated that other materials can also be used.

The device 100 further comprises straps 104 having buckles 106 for fastening and securing the support sheet 102 to the horse, when the device is fitted and in use. Alternatives means for fastening the device to the horse include clips, or portions of a hook and loop fastener. Further clips 108 are provided on the support sheet 102, as shown and are provided to fasten opposing sides of the support sheet 102 together, when the device is fitted, and in use. Alternative fasteners to clips 108 are as mentioned above.

The device 100 further comprises a neck extension 110, joined to the support sheet 102 at a join 112. In this respect, the support sheet 102 is arranged to extend up and around the neck or crest of the horse. The neck extension 110 is again provided in the form of a sheet so as to be complimentary in shape to the neck and/or crest of the horse. The neck extension 110 is permanently attached to the support sheet 102. In an alternative form, the neck extension 110 may be releasably fastened by suitable means such as a zip fastener, studs, clips or the like. Further clips 114 are provided for securing the neck extension 110 around the neck of the horse, when the device is in use. It will be appreciated that alternative means for securing the neck extension 110 can be provided, as hereinbefore described.

The device 100 further comprises first contact members 116 and 118. Again and in a similar manner to that previously described, the first contact members 116 and 118 are generally the most forward facing portions of the device 100, when in use and the horse is facing ahead. The first contact members 116 and 118 may be attached to the support sheet 102 by any suitable means. The first contact members 116 and 118 are stitched to the support sheet 102.

The first contact members 116 and 118 are generally provided in sheet form, in the form of a fabric, the fabric comprising a conductive mesh. Accordingly, the first contact members 116 and 118 form the outermost surface of the support sheet 102, when the device is in position on a horse.

The device 100 is also provided with a further first contact member 120. Details of the contact member 120 are as hereinbefore described having reference to contact members 116 and 118. As shown in FIG. 5, the first contact member 120 is positioned centrally about centre line 122, defining a line of symmetry that, when the device is in use, sits along and parallel to the spine and wither of the horse. The first contact member 120 is positioned, in use, to lie on the upper portion of the neck of the horse, in order to contact with a conductor of an electric fence should the horse lift its head from beneath the fence wire.

Figure 6:
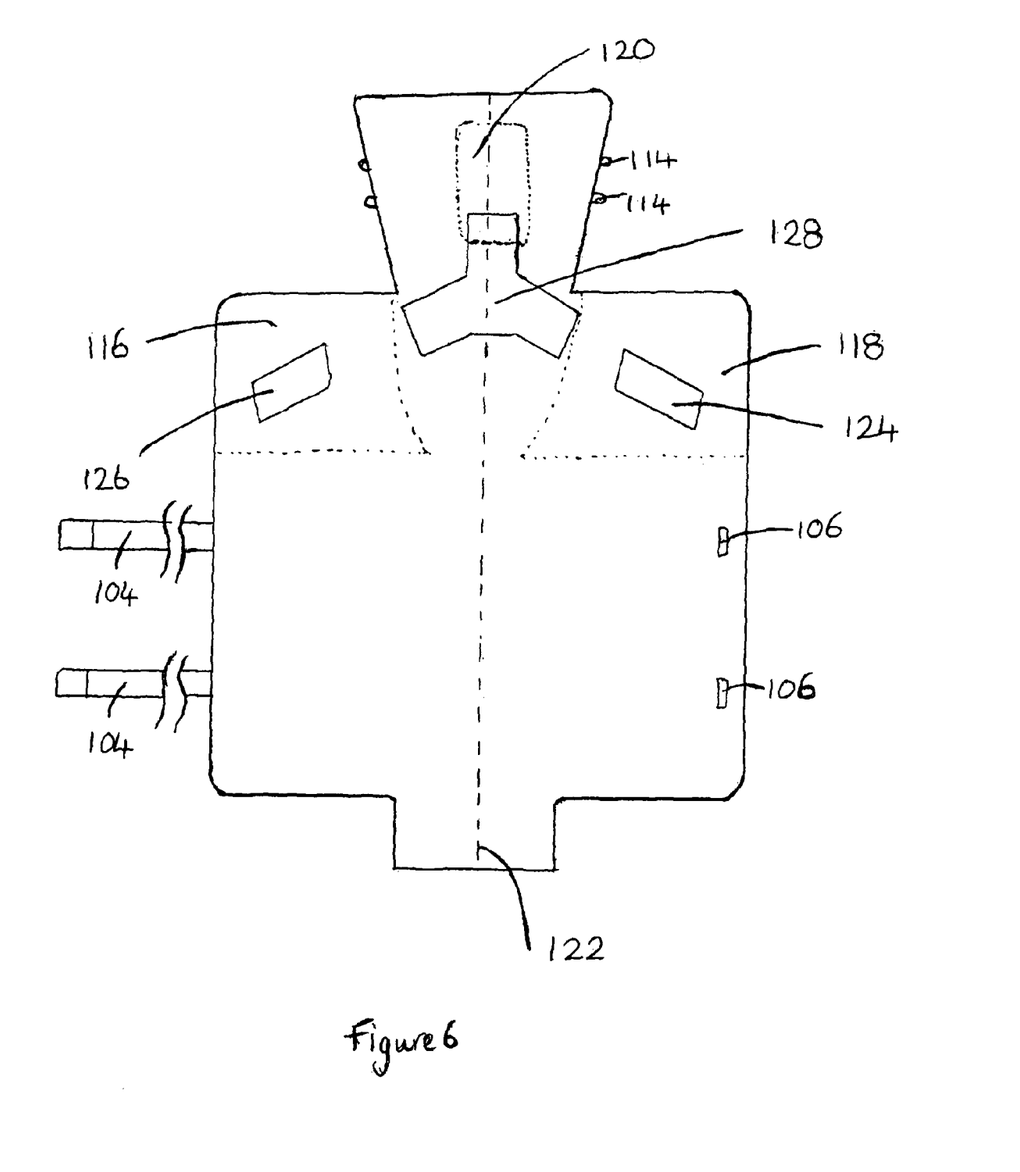
FIG. 6 is a plan view of the internal features of the device of FIG. 5.

With reference to FIG. 6, the device 100 further comprises second contact members 124 and 126, which provide a point at which an electric shock is delivered to the horse, and are therefore positioned to contact the skin of the horse, when the device is in use. The second contact member s 124 and 126 are provided in sheet form, in the form of a fabric, the fabric comprising a conductive mesh.

As shown in FIG. 6, the second contact members 124 and 126 are positioned symmetrically about the centre line 122 and are positioned on opposing sides of the support 102. The second contact members 124 and 126 are formed integrally with the support sheet 102 and are further positioned to underlie the first contact members 118 and 116, respectively, when the device is in use and positioned on the horse. In this respect, each of the first contact members 116 and 118 is provided with a corresponding second contact member 124, so as to lie respectively on the left and right side of the body of the horse. This arrangement is advantageous in that it allows for the directional control of the horse, when the device is in use. In this respect, the second contact member 124 on the left side of the body of the horse is directly connected to the first contact member 118 (indicated by way of broken line in FIG. 6) on the same side of the horse. A corresponding configuration can be seen on the right hand side of the body of the horse, where the second contact member 126 is directly connected to the first contact member 116 (again indicated by way of broken line in FIG. 6).

As described, the second contact members 124 and 126 are directly connected to the first contact members 118 and 116, respectively. Any suitable means may be employed to create a direct connection between the terminals and contact members, as indicated above. In this embodiment, the second contact members 124 and 126 are positioned to be in direct contact with one another. Alternatively, the second contact members 124 and 126 may be connected to the respective first contact members by means of an electrically conductive element, such as a wire or cable.

The device 100 is also provided with a further second contact member 128 disposed to underlie the first contact member 120 on the upper portion of the neck of the horse. Details of the material of the second contact member 128 are as hereinbefore described having reference to the second contact members 124 and 126. With reference to FIG. 6, the second contact member 128 is located symmetrically about centre line 122 and again is integral with the support sheet 102. The second contact member 128 is positioned to be directly connected with the first contact member 120, as shown.

The device 100 is fitted to the horse by first placing the support sheet 102 on the back of the horse, such that the centre line 122 of the device 100 aligns parallel with the back and wither of the horse. Opposing sides of the support sheet 102 are then draped over the respective opposing sides of the horse and secured into position by the straps 104, which are placed under the belly of the horse and secured using the buckles 106. The neck extension 110 is then wrapped around the neck of the horse and secured using clips 114. In a similar manner, the first contact members 116 and 116, positioned on the most forwardly portions of the support sheet 102, are wrapped around the front of the horse and again secured using the clips 108.

The device of the present invention is for use in controlling animals, particularly when employed in combination with an electric fence system. The device of the present invention also finds particular use in the training or conditioning of animals, in particular horses and ponies. One embodiment of the device of the present invention has been Mailed, in conjunction with a horse, in an area contained by an electric fence system. The trial clearly indicated the significance of the results that may be obtained through use of the device. In particular, one observation made was the effect of the device when teaching the animal the physical boundary of the field. Previously, without the use of the device, it was found that a particular problem arose with the control of the horse, in particular with the horse breaking through electric fences. Results of a number of trials conducted have shown that when the device is in use, the horse receives sufficient shocks and retreats away from the electric fence. More particularly, directional control of the animal is possible, when the device is configured as hereinbefore described, that is with the second contact members located in a position corresponding to the location of the first contact members. With this configuration, the horse moves away from the region in which the electric shock is delivered by the terminal and, hence, away from the electric fence and the boundary of the are to which the animal is confined.

In addition to the above, further results have been observed, following the removal of the device from the animal. It has been noticed that, following the removal of the device, the animal still refrained from approaching the fence. As such, a degree of conditioning of the animal may be achieved through the use of the device of the present invention. For example, it may not be necessary for the animal to wear the device for long periods of time. Rather, it may be possible to initially train the animal, and subsequently remove the device, allowing for the training of other animals.

The invention claimed is:

1. A device for controlling an animal, the device comprising:
    a support to be worn by the animal, the support comprising a rug or blanket to be worn by the animal, an opening formed in the support for the head of the animal to pass through, and straps for fastening and securing the support to the animal;
    a first contact member mounted on the support and disposed in a position at the outer surface of the rug or blanket for contacting an electric fence when the device is being worn by the animal, wherein the first contact member comprises a mesh or grid of electrically conductive wires;
    an electrically conductive flexible second contact member, separate from the first contact member, mounted on the support and in electrical contact with the first contact member, the second contact member being disposed on the inner surface of the rug or blanket to be in contact with the animal when the device is being worn by the animal;
    whereby, in use, an electrical current is conducted from the first contact member to the second contact member and an electric shock provided to the animal at the site of the second contact member when contact is made between the first contact member and an electric fence by the animal.

2. The device according to claim 1, herein the support comprises a cover or the animal.

3. The device according to claim 1, wherein the first contact member is located on the support in a position which in use presents the first contact member from one or more of the front and sides of the body of the animal.

4. The device according to claim 1, wherein the first contact member is located on the support in a position which in use presents the first contact member on top of the neck or hack of the animal.

5. The device according to claim 1, wherein the first contact member comprises a conductive fabric.

6. The device according to claim 1, comprising a plurality of first contact members disposed in a plurality of positions on the support, whereby in use the device presents first contact members at a plurality of positions on the animal.

7. The device according to claim 1, wherein the second contact member is located on the support in a position which in use presents the second contact member from the shoulder and/or the wither and/or the chest of the body of the animal.

8. The device according to claim 1, wherein the device comprises a plurality of second contact members.

9. The device according to claim 1, wherein the second contact member is releasably mounted to the support.

10. The device according to claim 1, wherein the second contact member comprises a conductive fabric.

11. The device according to claim 1, wherein the second contact member comprises a conductive mesh.

12. The device according to claim 1, wherein the or each second contact member is electrically connected to at least one corresponding first contact member.

13. The use of a device according to claim 1 in controlling the movement of an animal.

14. The use according to claim 13, wherein the animal is a horse or a pony.

* * * * *